Nov. 7, 1944. F. E. FREY 2,362,196
TREATMENT OF HYDROCARBONS TO PRODUCE VALUABLE PRODUCTS
Filed June 3, 1941 2 Sheets-Sheet 1
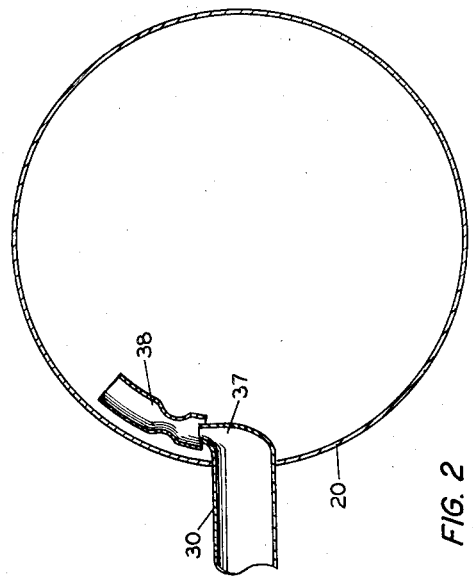
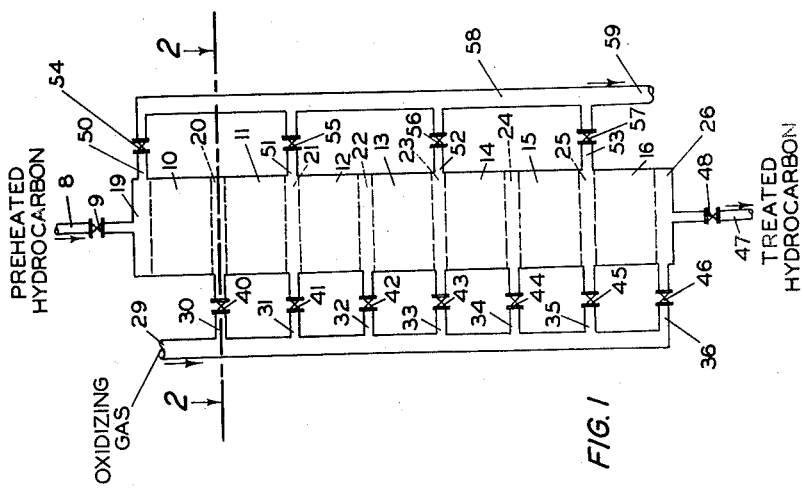
INVENTOR
FREDERICK E. FREY
BY
ATTORNEY Nov. 7, 1944.   F. E. FREY   2,362,196
TREATMENT OF HYDROCARBONS TO PRODUCE VALUABLE PRODUCTS
Filed June 3, 1941   2 Sheets-Sheet 2
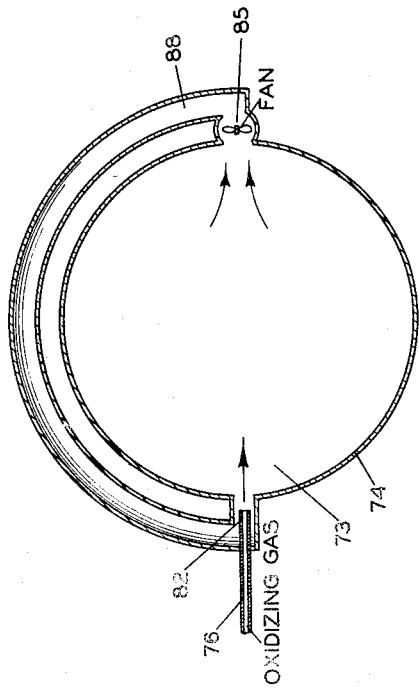
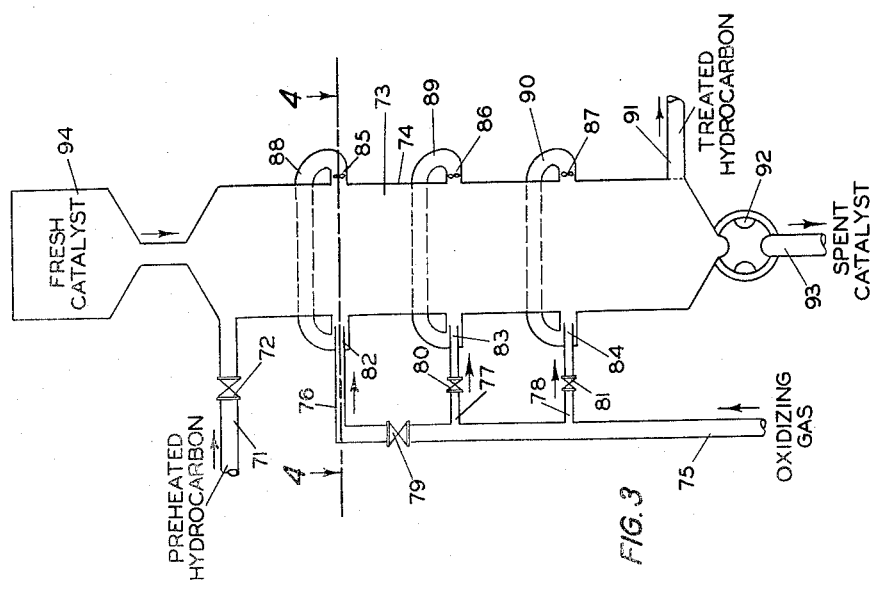
INVENTOR
FREDERICK E. FREY
BY
ATTORNEY Patented Nov. 7, 1944

2,362,196

UNITED STATES PATENT OFFICE 2,362,196

TREATMENT OF HYDROCARBONS TO PRODUCE VALUABLE PRODUCTS

Frederick E. Frey, Bartlesville, Okla., assignor to Phillips Petroleum Company, a corporation of Delaware Application June 3, 1941, Serial No. 396,448

5 Claims. (Cl. 260—683.3)

The present invention relates to the treatment of hydrocarbons to produce valuable products therefrom, and more specifically to the treatment of hydrocarbons under conditions to promote progressive dehydrogenation in the presence of a catalyst.

It is known that catalysts comprising alumina, such as activated alumina, dehydrated aluminum oxide gel, bauxite, and similar materials, coated or uncoated with catalytic promoters such as the oxides of the metals of the sixth group of the periodic table, are capable of dehydrogenating hydrocarbons at elevated temperatures.

It is also known that dehydrogenation can be accomplished to some extent in the presence of catalysts and with the addition of free oxygen. However, such procedures have never been adopted commercially, principally because of the difficulties encountered in controlling the reaction. That is, under normal conditions, decomposition and combustion reactions take place to such an extent as to render the yield of dehydrogenated product unsatisfactory. The addition of oxygen in the conventional manner to hydrocarbons in the presence of catalysts at such elevated temperatures as would be necessary for dehydrogenation causes destruction of the hydrocarbon molecular skeleton with formation of carbon monoxide and other reaction products. In other words, in conventional methods, where oxygen is added in moderately high percentages, inordinately low temperatures must be applied to avoid excessive localized temperatures through surface combustion with consequent loss in efficiency. This is true even though multi-point addition is resorted to, since temperature "peaks" occur in the immediate vicinity of each point of addition which exceed the kindling or decomposition temperature of the hydrocarbon. Low-temperature regions in the intermediate zones severely reduce the degree of conversion. Furthermore, undiluted oxygen or air will burn out completely on initial contact with the catalyst, thereby becoming unavailable for aiding the dehydrogenation reaction in lower areas of the catalyst bed.

In accordance with this invention it is possible to conduct such a dehydrogenation reaction at greatly increased temperatures and in ranges which have heretofore been considered impracticable because of splitting and decomposition reactions which were engendered at such temperatures. A principal factor contributing to increased yields of desired products in the practice of this invention is a substantial increase in the kindling temperature which enables dehydrogenation at optimum temperatures with minimum formation of oxides of carbon and other decomposition products. This is accomplished by the injection of the oxygen in such manner and in such amount as to produce a high degree of oxygen dispersion at low concentration in the hydrocarbon stream.

The primary object of this invention is to provide a process for the treatment of hydrocarbons with gases containing free oxygen under conditions such that progressive dehydrogenation is the predominating reaction.

A further object is to avoid, in such a process, destruction of the hydrocarbon skeleton by combustion reactions.

Another object is the production, in such a process, of free hydrogen with minimum formation of oxides of carbon.

A still further object ancillary to the primary object is the removal of carbonaceous matter deposited in the catalyst by an oxidation proceeding concurrently with the dehydrogenation, while supplying through oxidation a quantity of heat sufficient to affect materially the endothermic effect of dehydrogenation with consequent temperature drop.

According to the present invention, I have found that a dehydrogenation possessing these desirable characteristics can be effected by intimately mixing oxygen with the hydrocarbons being treated so that, due to the high degree of dispersion, concentrations conducive to cracking or burning are avoided. This is accomplished near the point at which the oxygen enters the reaction zone and preferably immediately before contact with the catalyst, since decomposition proceeds rapidly thereafter in the presence of substantial concentrations. The oxygen thus highly dispersed in the hydrocarbon appears to actively promote the dehydrogenation reaction in the presence of the catalyst and combines to some extent with free hydrogen to form water. The resultant liberation of heat is an advantageous feature, as hereinafter more fully described. The remaining oxygen, which is substantially unconsumed by decomposition or splitting reactions, is available to promote further conversion in lower areas of the catalyst bed.

Due to the endothermic nature of catalytic dehydrogenation, a very large amount of heat must be available in order for it to proceed efficiently. Heretofore, the introduction of heat in such endothermic processes as catalytic dehydrogenation, in sufficient quantity to offset the paralyzing effect of the temperature drop caused by occurrence of the endothermic reactions, has constituted a major engineering problem. It is one object of my invention to supply such heat by direct oxidation under such conditions that nondirected and localized combustion reactions are minimized, and that production of hydrocarbons having lower hydrogen-to-carbon ratios than that of the hydrocarbon being treated is favored. This is accomplished by multi-point addition of oxygen to the reaction zone in sufficient quantity to replenish oxygen consumed in the reaction and maintain the hydrocarbons at conversion temperature. The reaction which I obtain does not consist to a major degree in the elision of hydrogen from the reactant hydrocarbon with concomitant formation of water, but rather in the production of substantial dehydrogenation where free hydrogen and free oxygen are present in the reacting gas phase simultaneously, the oxygen being present at very low partial pressure.

In general, dehydrogenation may take place at temperatures from 840 to 1470° F. but, to avoid substantial decomposition and still insure a favorable yield of the dehydrogenated product, temperatures of from 930 to 1200° F. are ordinarily preferred. The reaction temperature will depend to some extent on the catalyst employed. Obviously catalysts which will promote dehydrogenation within the desired higher temperature ranges of this invention are preferred. Catalysts which are limited to operation at low temperatures decrease the dehydrogenation conversion ratio and hence are less desirable. I have found aluminum oxide catalysts particularly useful in the process of the present invention, although obviously other catalysts may be employed, and ordinarily the selection of a catalyst will be governed by the material to be treated and may be readily determined by one skilled in the art. For instance, chromic oxide catalysts are well suited for dehydrogenating pentanes, whereas bauxite and activated alumina favor the conversion of isobutane and propane. In each case, reaction conditions must be regulated for the particular catalyst and hydrocarbon undergoing conversion. Among the catalysts which may be employed in the practice of this invention are aluminum oxide, chromic and aluminum oxides, titanium oxide, zirconium oxide and oxides of group six in the periodic table or mixtures thereof. The hydrocarbons which may be converted range from compounds having two carbon atoms to the molecule to those containing eight carbon atoms to the molecule and even those having higher molecular weights, to a lesser extent.

In accordance with the present invention, I have found that the degree of dehydrogenation produced by the aforesaid catalysts is much increased by the addition of free oxygen in a manner so as to obtain an intimate mixture with the hydrocarbons before substantial contact with the dehydrogenation catalyst. By controlled additions of oxygen I not only remove some of the hydrogen from the reaction zone by oxidation to water, thereby decreasing the mass-action effect of the liberated hydrogen, but also promote the catalytic dehydrogenation itself, so that the concentration of hydrogen in the effluent may be even higher than that prevailing when oxygen is not used.

By regulation of the oxygen content in the reaction mixture by controlled injection, an excess of free hydrogen is always maintained in the reaction mixture, and for this reason little or no cracking of the hydrocarbons takes place, which is evidenced by the negligible amounts or complete absence of carbon monoxide and dioxide in the effluents. This result is attained because the quantity of oxygen is limited and the oxygen is highly dispersed in the hydrocarbon so that appreciable decomposition does not occur in the reaction chamber.

The amount of oxygen should not exceed that necessary to maintain the reaction mixture at the desired dehydrogenation temperature, which should be within the range of about 840 to 1470° F., preferably between 930 and 1200° F. Under practical operating conditions, the amount of oxygen may be sufficient to oxidize about three-fourths or more of the liberated hydrogen to water; however, somewhat less than this amount may be adequate, depending upon the hydrocarbon being treated, the efficiency of heat exchange between the outgoing and the incoming reaction mixtures, and upon how close the reaction zone approaches an adiabatic condition. Essential requirements of my process are the dispersal of the oxygen preferably in low concentration in the hydrocarbon stream, and the introduction at any one inlet zone of oxygen in an amount only sufficient to produce heat equivalent to a temperature rise of 25 to 75° F. or even less. These requirements are met by multi-point addition of the oxygen to produce concentrations of 1 to 5 mol per cent (approximately 1 atom of oxygen to each 10 to 50 molecules of hydrocarbon) at any one zone of addition; the higher percentages in this range are permissible with conversion stock of relatively high molecular weight, such as gasoline, and the lower percentages with conversion stock of relatively low molecular weight, such as ethane, propane or butane. Ordinarily and for best results, mol percentages below 1 per cent and preferably around 0.5 per cent (approximately 1 atom of oxygen to each 100 molecules of hydrocarbon) are used. For the treatment of ethane, an aggregate of up to about 25 mol per cent (approximately 1 atom of oxygen to each 2 molecules of hydrocarbon) of the over-all unreacted mixture may be oxygen; for the treatment of higher paraffins, somewhat lower aggregate oxygen concentrations are usually sufficient because of the greater capacity for carrying sensible heat; for the treatment of butane or heavier hydrocarbons, an aggregate oxygen concentration of from 5 to 15 mol per cent (approximately 1 atom of oxygen to each 3.3 to 10 molecules of hydrocarbon) is preferred. If desired, air may be used as the oxidizing gas instead of oxygen; however, the volume of oxidizing gas must then be correspondingly increased because of the presence of the diluent nitrogen.

The process of the invention is especially well suited for the production of olefins and smaller amounts of diolefins and cyclic hydrocarbons from paraffins, such as ethane, propane, butanes, pentanes, hexanes, and heavier paraffins; these may be treated either as pure individual hydrocarbons, diluted or undiluted with an inert gas, or as components of mixtures such as gasoline or other motor fuel. Likewise, butadiene may be produced in accordance with the present invention from butane, butenes or mixtures thereof.

The space velocity may be from about 2000 to 5000 volumes of the mixture comprising oxygen and vaporized hydrocarbon per volume of catalyst per hour, depending upon the hydrocarbon, the activity of the catalyst, and the temperature; a suitable space velocity may be readily determined by trial for the conditions of any particular case. For the treatment of one or more of the butanes over bauxite at a temperature of from 930 to 1200° F. a space velocity of from 50 to 1000 per hour is usually satisfactory and is preferred.

The mode of operation of my invention may be further described and illustrated with the aid of the accompanying drawings, in which: Fig. 1 is a schematic or diagrammatic sectional view of a preferred arrangement of apparatus; Fig. 2 is a relatively enlarged and more detailed diagrammatic cross-sectional view along line 2—2 of Fig. 1, in the direction of the arrows; Fig. 3 is a schematic, partly sectional and partly elevational view of a more specific embodiment of my invention; and Fig. 4 is an enlarged diagrammatic cross-sectional view along line 4—4 of Fig. 3, in the direction of the arrows. These figures are purely diagrammatic and are not drawn to scale; hence, it is to be understood that they do not impose any dimensional or scale limitations upon my invention.

In the arrangement of Fig. 1, the hydrocarbon to be treated, preferably mixed with air or oxygen, enters by inlet 8 controlled by valve 9 from a heat-exchanger and/or preheater, not shown, in which it was heated to a selected reaction temperature. It then passes through a series of catalyst-containing zones 10 to 16, inclusive, wherein it undergoes reaction in consequence of the presence of the catalyst and in consequence of the addition of oxidizing gas in the intermediate catalyst-free zones 20 to 25, inclusive. The addition of oxidizing gas is effected by pipe 29 having branches 30 to 36, inclusive, of which end branch 36 is closed except during revivification of the catalyst. The branches are provided with valves 40 to 46, inclusive, for controlling the addition of oxidizing gas, which preferably is effected automatically by suitable mechanisms actuated by instruments not shown, in catalyst-free zones 20 to 25, inclusive, that are responsive to changes in the temperature or in the composition of the reaction mixture. The mixture of products and unreacted hydrocarbon finally passes from the system by outlet 47 controlled by valve 48 to storage or to subsequent treating steps, not shown.

A preferred mode of addition of the oxidizing gas is diagrammatically illustrated in Fig. 2, in which the oxidizing gas passes from the pipe branch 30 through nozzle 37 into the Venturi tube 38, where it is rapidly mixed with the reaction mixture already present in catalyst-free zone 20. Nozzle 37 and Venturi tube 38 are preferably directed so that the oxygen enters the mixing chamber tangentially thereof, thereby imparting a whirling or centrifugal motion to the reaction mixture in zone 20, which is similar in operation and effect to zones 21 through 26, inclusive. A plurality of such nozzles and Venturi tubes may be located in each mixing zone. The addition of the oxidizing gas in this manner is highly desirable to prevent combustion, since otherwise and in cases where such an intimate mixture is not obtained, decomposition will occur or else the temperature must be maintained at such a low point as to severely impair the efficiency of the operation. The nozzle and Venturi tube arrangement effects a very rapid mixing and dispersing of the oxygen in limited concentration with the heated hydrocarbon gases.

The arrangement shown in Fig. 1 may be utilized for reactivating the catalyst, and during reactivation valves 9 and 48 are closed, and an oxidizing gas, preferably air, is conducted by pipe 29 and branches 30, 32, 34 and 36 into catalyst-free zones 20, 22, 24 and 26; branches 31, 33 and 35 being closed by valves 41, 43 and 45. The oxidizing gas passes through the catalyst-containing zones in parallel, whereby reactivation is caused to proceed simultaneously in all of the catalyst-containing zones, resulting in a much shorter revivification period than that required if they were arranged in series; in addition, the back pressure caused by the catalyst to the flow of the revivifying or oxidizing gas is relatively much smaller. The oxidizing gas, after passing through the catalyst beds, passes into zones 19, 21, 23 and 25 and out of the catalyst tower through pipes 50 to 53, and then from the system through outlet 59.

In the specific embodiment diagrammatically illustrated in Fig. 3, the preheated hydrocarbon enters by inlet 71 controlled by valve 72 into one end of an elongated catalyst bed 73 confined in catalyst chamber 74; the individual particles of the catalyst, for the sake of simplicity, are not specifically delineated. Simultaneously, a gas containing free oxygen enters by inlet 75 and is carried to various points of the catalyst bed by distributor tubes 76, 77 and 78 having valves 79, 80 and 81 and ending in nozzles 82, 83 and 84, respectively. As the hydrocarbon passes through the catalyst bed, it undergoes reaction because of the presence of both the catalyst and the oxygen. Thorough mixing of the oxidizing gas with the hydrocarbon is effected by the action of the nozzles and by a forced circulation produced by fans 85, 86 and 87, which cause some of the reaction mixture to pass along circuits or conduits 88, 89 and 90 to the regions immediately surrounding nozzles 82, 83 and 84, respectively. This forced circulation is more clearly indicated by the enlarged cross-sectional view given in Fig. 4. The general directions of flow of the reaction mixture are indicated by arrows in both Fig. 3 and Fig. 4. Eventually the reaction mixture leaves the catalyst bed by exit 91, at the end of the catalyst bed opposite to that of inlet 71.

Fig. 3 shows a means for continuous removal and replacement of spent catalyst; this is effected by rotating member 92, which carries portions of the spent catalyst at the bottom of the catalyst bed to exit 93. From exit 93, the catalyst may be carried to a revivification unit, not shown, in which it may be revivified. After revivification, the catalyst may be re-used by being transferred to catalyst reservoir 94, from which fresh and/or revivified catalyst is automatically and virtually continuously added by gravity to the catalyst bed in an amount equal to that removed by rotating member 92.

The following examples are given for illustrative purposes only; they are not to be considered as establishing any limitation to my invention.

*Example I*

Isobutane at 1 atmosphere was dehydrogenated at a flow rate of 1 liter per hour by passage over a 26 cc. sample of granular bauxite at 968° F.; after a number of days, the apparent conversion to isobutylene, as measured by an automatic gas analyzer of the thermal conductivity type that was responsive to the hydrogen content of the gas, had decreased to 14.8 per cent. The addition of 60 cc. of pure oxygen per hour to the isobutane caused the apparent conversion to increase to 19.4 per cent; thereafter the apparent conversion decreased to 13.8 per cent in 16 hours. At this point, an Orsat analysis showed that the effluent gas contained 0.00 per cent carbon dioxide and 16.07 per cent olefins absorbable by 90 per cent sulfuric acid.

The addition of oxygen was stopped, and the apparent conversion decreased sharply to 11.1 per cent, at which it remained for several hours. A sample of the effluent gas taken during this constant-conversion period contained only 12.25 per cent olefins absorbable by 90 per cent sulfuric acid.

When oxygen was again added to the isobutane, at the rate of 150 cc. per hour, the apparent conversion increased rapidly to 21.0 per cent and then decreased to 16.5 per cent in about an hour. The effluent gas at this point contained 18.18 per cent olefins absorbable by 90 per cent sulfuric acid, 0.66 per cent ethylene, 3.43 per cent carbon monoxide, and no carbon dioxide. Considerable water, equivalent to about one-half of the initial oxygen, was collected; it was acidic to litmus.

*Example II*

Propane preheated to 1150° F. is passed at a pressure of 2 atmospheres and a space velocity of 500 relative volumes per hour over bauxite in an elongated adiabatic bed. Air is added at four serially arranged points in such amount that 3 mol per cent of oxygen (approximately 1 atom of oxygen for each 16 molecules of propane) is dispersed in the total stream, whereby the average reaction temperature is maintained at about 1080° F. Conversion of 30 per cent of the propane into propylene is thus effected.

Inasmuch as the foregoing specification comprises preferred embodiments of the invention it is to be understood that these are merely exemplary and that variations and modifications may be made therein without departing substantially from the invention, and that the invention is not limited to these embodiments but solely by the appended claims.

I claim:

1. An apparatus for conducting a hydrocarbon conversion process which involves the reaction between a gaseous hydrocarbon and another gas in the presence of a catalyst, which comprises, in combination, a relatively large elongated vertical converter shell, a plurality of vertically spaced catalyst-containing zones in said shell with intermediate catalyst-free zones, an inlet conduit connected adjacent one end of said shell for admitting a gaseous hydrocarbon, an outlet conduit connected adjacent the other end of said shell for withdrawing treated gaseous products therefrom, a manifold for admitting said other gas to said shell, a plurality of branch lines leading from said manifold into said catalyst-free zones to a point just inside said shell, nozzles associated with each of said branch lines just inside said shell and arranged to discharge tangentially of said shell, Venturi tubes associated with each of said nozzles in surrounding relationship therewith and arranged to discharge tangentially of said shell, said Venturi tubes having their suction inlets in free communication with said catalyst-free zones.

2. A process for the dehydrogenation of a paraffin hydrocarbon having at least two carbon atoms in the molecule to a mono-olefin hydrocarbon without the formation of substantial amounts of oxides of carbon, which comprises passing a fluid stream comprising the hydrocarbon maintained at a normal dehydrogenation temperature through a plurality of injection points into and through a reaction zone containing a dehydrogenation catalyst, intimately mixing a gas comprising free oxygen with the hydrocarbon streams at each of said injection points, out of contact with said catalyst but near the point at which the mixed stream enters the reaction zone and before the mixed stream comes into contact with the catalyst in said zone, in such proportion that not less than a total of approximately 1 atom of oxygen is admitted for each 100 molecules of hydrocarbon but less than that which produces substantial amounts of oxides of carbon in the products and such that not more than a total of approximately 1 atom of oxygen is admitted for each 2 molecules of hydrocarbon passing through the entire catalytic reaction zone, and in such manner that not more than approximately 1 atom of oxygen is introduced at any one of the plurality of injection points to each 10 molecules of hydrocarbon in the entire reaction zone, and recovering the dehydrogenated product.

3. A process for the dehydrogenation of propane to propylene without the formation of substantial amounts of oxides of carbon, which comprises passing a heated fluid stream of propane through a bed of granular bauxite catalyst at a temperature within the range of approximately 930° to approximately 1200° F., intimately mixing air with said propane stream, out of contact with said catalyst but near the point at which the mixed stream enters the bed of catalyst and before the mixed stream comes into contact with the catalyst, in such proportion that a total of approximately 1 atom of oxygen is injected into said propane stream for each 16 molecules of hydrocarbon passing through the entire catalytic reaction zone, and recovering the propylene from the products.

4. A process for the dehydrogenation of isobutane to a butene without the formation of substantial amounts of oxides of carbon, which comprises passing a fluid stream of isobutane at a temperature within the range of approximately 930° to approximately 1200° F. through a plurality of injection points into and through a reaction zone containing a bed of granular bauxite catalyst, intimately mixing a gas containing free oxygen with the hydrocarbon stream at each of said injection points, out of contact with said catalyst but near the point at which the mixed stream enters the reaction zone and before the mixed stream comes into contact with the catalyst in said zone, in such proportion that approximately 60 cc. of oxygen is admitted for each 1000 cc. of hydrocarbon passing through the entire bed of catalyst and in such manner that not more than 1 atom of oxygen is introduced at any one of the plurality of injection points to each 10 molecules of hydrocarbon in the entire reaction zone, and recovering the butene from the products.

5. A process for the dehydrogenation of a paraffin hydrocarbon having at least two carbon atoms in the molecule to a mono-olefin hydrocarbon without the formation of substantial amounts of oxides of carbon, which comprises passing a fluid stream comprising the hydrocarbon maintained at a normal dehydrogenation temperature through a plurality of injection points into and through a reaction zone containing a dehydrogenation catalyst, intimately mixing a gas containing free oxygen with the hydrocarbon stream at each of said injection points, out of contact with said catalyst but near the point at which the mixed stream enters the reaction zone and before the mixed stream comes into contact with the catalyst in said zone, in such proportion that not less than a total of approximately 1 atom of oxygen is admitted for each 100 molecules of hydrocarbon but less than that which produces substantial amounts of oxides of carbon in the products and such that not more than a total of approximately 1 atom of oxygen is admitted for each 2 molecules of hydrocarbon passing through the entire reaction zone, and in such manner that not more than approximately 1 atom of oxygen is introduced at any one of the plurality of injection points to each 10 molecules of hydrocarbon in the entire reaction zone, circulating a portion of the reaction mixture outside of said reaction zone and reintroducing the same into said zone in the region of one of the injection points, thereby producing an intimate dispersion of oxygen in said hydrocarbon stream, continuously removing spent catalyst from and introducing fresh catalyst into said chamber, and recovering the dehydrogenated product.

FREDERICK E. FREY.